Patented Nov. 14, 1933

1,935,177

UNITED STATES PATENT OFFICE 1,935,177

PROCESS OF PREPARING CATALYTIC MASSES

Gerald C. Connolly and Jeremiah A. Pierce, Baltimore, Md., assignors to The Silica Gel Corporation, Baltimore, Md., a corporation of Maryland No Drawing. Application December 9, 1930
Serial No. 501,163

19 Claims. (Cl. 23—233)

The present invention relates to processes of preparing catalytic masses comprising a carrier having a catalytic substance associated therewith.

The steps of the process may be briefly listed as follows:

1. Charging a batch of carrier material with a solution of a reactant substance;
2. Charging another batch of carrier material with a solution of a compound of a metal capable of being converted by said reactant substance into a catalytic compound of said metal, which may or may not contain an activator or stimulator;
3. Mixing the two batches together so as to cause the reaction between the reactant substance and the metal compound;
4. Incorporating in the mixture, if desired, either a batch of carrier material impregnated with a compound of a catalytic metal, or a diluent, or both; and
5. Drying without washing, or forming the mixture into granules and then drying.

The carrier material may be any hydrous gel. By the term "hydrous gel" is meant any hydrogel or jelly, and/or gelatinous precipitate, or mixtures of the two, of the oxides of silicon, germanium, chromium, tungsten, titanium, aluminum, tin, and the like, or mixtures of the aforesaid oxides, dehydrated or not. Further, the carrier material may be a powdered solid material of any nature which is unaffected by heat or chemical reaction to such degree as to destroy its value as a carrier, for example, fuller's earth, kieselguhr, clay, gel fines of any kind, and the like.

The reactant substance with which the carrier material is charged may be either a compound capable of being selectively adsorbed by the carrier material, as for example, a hydroxyl bearing compound or one which diffuses into the carrier material without being selectively adsorbed thereby, as for instance a non-hydroxyl bearing compound. The hydroxyl bearing compound may consist of an aqueous solution of either the hydroxides of the alkali metals, as sodium, potassium, lithium, caesium, rubidium; the hydroxides of the alkaline earth metals as, calcium, strontium, and barium; the hydroxides of the non-metals such as ammonium hydroxide; hydroxyl containing amines such as the ethanolamines, mono-, di-, and tri-ethanolamines, hydroxylamine; or compounds which hydrolyze readily and yield upon hydrolysis compounds exhibiting the properties of the hydroxides of the alkali bearing metals such as the carbonates of the alkali forming metals, and carbamates.

The non-hydroxyl bearing compound may consist of an aqueous solution of a salt of a metal which reacts with a solution of a salt of another metal to form an active compound of said other metal, for example, salts of the alkali metals as potassium vanadite, soluble salts of silver, chromium, zinc, palladium, platinum, tin, iron, calcium, copper, nickel, etc; or non-hydroxyl containing amines such as aniline and the like.

The metal compound capable of being converted by a reactant substance into an active compound of said metal, may be a salt of a metal capable of forming either hydrous oxides or insoluble basic salts upon reaction with said reactant substance. The metallic salts which may be used for this purpose are those of the metals such as iron, chromium, aluminum, gallium, indium, thorium, copper, cobalt, nickel, silver, gold, beryllium, magnesium, zinc, cadmium, mercury, lead, germanium, tin, titanium, zirconium, cerium terbium, yttrium, bismuth, molybdenum, tungsten, uranium, manganese, ruthenium, rhodium, palladium, caesium, iridium, vanadium, and platinum. Of the salts of the metals mentioned, it is preferred to use those of vanadium.

The concentration of the solution of the reactant substance with which the batch of carrier material is charged is dependent upon the nature of the carrier material and the amount of active metal compound required in the final product. In the case where the carrier is a hydrogel, and the reactant substance is a hydroxyl bearing compound, the strength of the hydroxyl bearing compound solution may be such as to charge the hydrogel partially or completely without attacking the structure thereof, as for example, 0.02 to 0.2% by weight. Then again, it may be of such strength as to completely charge the hydrogel and also react therewith to a limited extent or to such degree as to modify its character without destroying the structure thereof, as for instance, 0.25 to 1%, and even as high as 5% by weight.

Where the reactant substance employed is a non-hydroxyl bearing compound which is chemically inert with respect to the hydrous gel or carrier material other than a hydrous gel, the strength of the solution of such compound may range from 0.5% to 10% by weight, or even higher.

The strength of the solution of the metal compound capable of being converted by a reactant substance into an active compound of said metal with which the batch of carrier material is charged, is variable. It may be of a concentration which is less than, equal to, or in excess of the theoretical amount required to chemically combine with all of the reactant substance.

The two batches of carrier material may be incorporated together in such relative amounts that one of the solutions is present in a quantity which is less than, substantially equal to, or in excess of the theoretical amount required to chemically combine with the other. This is particularly advantageous in that it enables a product to be produced having the active substance present in any amount, and in the form of one or more compounds. For a product having the active substance present in any amount and in only one form, the two batches of carrier material are mixed together in such relative amounts that either the reactant solution is in excess of, or substantially equal to, that theoretically required to chemically react with all of the metal compound solution or the metal compound solution is less than, or substantially equal to, the theoretical amount required to chemically combine with all of the reactant substance solution. Where it is desired to produce a product having the active substance present in any amount, and in more than one form, the two batches are incorporated together in such relative amounts that either the reactant substance solution is less than the calculated theoretical amount required to chemically combine with the metal compound solution or the metal compound solution is in excess of the required amount to combine with the reactant substance solution.

The present invention is of particular economic value where a hydrogel is utilized as the carrier because hydrogel of any size particle may be used. Thus, waste hydrogel not utilizable in other processes may be employed to advantage.

Where it is desired to produce a product having an activator or stimulator substance present therein, the substance is admixed with the solution of the metal compound capable of being converted by a reactant substance into an active compound of said metal. Such substance may be a salt of aluminum as aluminum sulphate; compounds of boron such as sodium tetraborate, or potassium tetraborate, or boric acid; compounds of calcium such as calcium chloride; or salts of tin, iron, thorium, bismuth, beryllium, titanium, and other metals.

The diluents which may be used are materials such as a hydrogel or jelly, or gelatinous precipitates, or mixtures of the two, of the oxides of silicon, titanium, tungsten, tin, aluminum, germanium, chromium, and the like, or mixtures of said oxides, dried gels and/or precipitates of one or more of said oxides, or a powdered solid material, as for example, clay, fuller's earth, kieselguhr, gel fines of any kind, and the like. The amount which may be added to the mixture is variable.

The product obtained by the process according to the present invention consists of granules of a carrier material having one or more different metal compounds heterogeneously distributed in and on the granules.

The product thus obtained is particularly suited for use as a catalyst in processes such as the process for making sulphur trioxide by reacting an oxidizing gas with sulphur dioxide in the presence of a catalyst at an elevated temperature. Processes of this nature in which it is employed as a catalyst show a conversion of sulphur dioxide into sulphur trioxide of 98.5% or more.

Specific examples of the process are as follows:

Example 1

A vanadyl sulphate solution is prepared in any well-known manner as by suspending vanadic oxide ($V_2O_5$) in a dilute solution of sulphuric acid, heating to almost the boiling point, injecting or blowing sulphur dioxide gas into the mixture until the vanadic oxide has dissolved, and then boiling off the excess sulphur dioxide. The resulting solution is of a dark blue color.

A batch of a carrier material such as a hydrogel of silica, preferably with a dry surface, is immersed in a solution of a hydroxyl bearing compound, as for example sodium hydroxide of about 1% strength by weight, and is allowed to remain therein for a sufficient time to enable the alkali to be adsorbed and react with the hydrogel to a limited extent but not to such a degree that the structure of the hydrogel is destroyed. Soaking the hydrogel in the sodium hydroxide solution for a number of hours, say 18 hours, is sufficient. The spent hydroxide solution is then separated from the hydrogel as by draining.

Another batch of a carrier material such as a hydrogel of silica, preferably with a dry surface, is immersed in the solution of a vanadyl sulphate prepared in the manner indicated above, and allowed to remain therein until it is charged with the vanadyl sulphate solution. Usually immersion for a number of hours, say 24 hours, is sufficient. A vanadyl sulphate solution containing 0.0327 grams per cubic centimeter of water expressed as $V_2O_5$ gives satisfactory results. Although a vanadyl sulphate solution of the aforesaid strength is used, it is to be understood that solutions of a greater or lesser strength may be employed. The vanadyl sulphate solution is then separated from the hydrogel as by draining.

100 grams of the batch of hydrogel charged with sodium hydroxide is mixed with 75 grams of the batch of hydrogel charged with vanadyl sulphate, and kneaded by mechanical means so as to thoroughly incorporate the two batches together and permit the reaction between the alkali and vanadyl sulphate. As the relative amounts of the two batches are such that the alkali is present in a quantity in excess of that theoretically required to combine with all of the vanadyl sulphate, the mass after incorporation contains only one compound of an active metal, namely, vanadium hydroxide. The mass is then dried, or extruded and dried in any suitable manner. The drying converts the hydrogel into a hard porous material termed the "gel". The drying may be effected by passing air at a temperature of 75° to 120° C. over the hydrogel and later at a higher temperature, say 300° to 400° C.

Example 2

100 grams of a batch of silica hydrogel charged with sodium hydroxide and 150 grams of a batch of silica hydrogel charged with vanadyl sulphate, in the manner described in Example 1, are incorporated together as by kneading. During the incorporation the vanadyl sulphate reacts with the sodium hydroxide, forming vanadium hydroxide. As the relative amounts of the two batches are such that the vanadyl sulphate is present in a quantity in excess of that theoretically required to combine with all of the alkali, the mixture after incorporation contains two compounds of vanadium, namely, vanadium hydroxide and the uncombined vanadyl sulphate. The mass is then dried or extruded and dried as described in Example 1.

Example 3

A batch of silica hydrogel is charged with a vanadyl sulphate containing an activator substance. The vanadyl sulphate solution is prepared in the same manner as described in Example 1. To this solution is added an activator substance, for example, potassium tetraborate, in an amount of 10 grains or less of the tetraborate to each 300 cc. of the vanadyl sulphate solution.

150 grams of the silica hydrogel charged with vanadyl sulphate containing the activator substance is mixed with 100 grams of silica hydrogel charged with sodium hydroxide in the manner described in Example 1, and the two batches of hydrogel incorporated together. Since the relative amounts of the two batches are such that the vanadyl sulphate solution containing potassium tetraborate is present in a quantity in excess of that theoretically required to combine with all of the alkali, the mixture after incorporation contains two compounds of vanadium, namely, the reaction product, vanadium hydroxide, and the uncombined vanadyl sulphate, and potassium tetraborate. The mass is then treated as in Example 1.

Example 4

To the mixture of the two batches of silica hydrogel of Example 1, is added a diluent material such as a hydrous gel of titania in an amount of about 35% by weight of the total mixture. The mass is then converted into a final product as described in Example 1.

Example 5

To the mixture of the two batches of silica hydrogel of Example 1 is added a carrier material such as the hydrous gel of alumina impregnated with beryllium hydroxide in an amount of about 25 to 50% by weight of the total mixture. The mass is then converted into a final product as described in Example 1.

Example 6

To the mixture of the two batches of hydrogel of Example 1, is added a diluent, and a carrier material impregnated with a metal compound decomposable by heat into an active compound. The diluent may be a silica hydrogel or the dried silica gel. If silica hydrogen is desired to be used, it is preferably added in an amount of about 50 to 60% by weight of the total mixture. Where the dried silica gel is used as a diluent, it is preferably added in a finely divided state, say gel particles of a size of 300 mesh or finer, and in an amount of about 10 to 20% by weight of the total mixture.

The carrier material impregnated with a metal compound which is added to the mixture may be a hydrogel of silica, titania, or stannia, impregnated with aluminum sulphate. It is preferably added in an amount of about 5–15% of the total mixture.

The mass is then treated in the same manner as described in Example 1 to convert it into a finished product.

Example 7

A batch of silica hydrogel is immersed in a solution of ammonium vanadite and allowed to remain therein for a number of hours, say 24 hours, or more. The concentration of the ammonium vanadite solution may range from 0.1 normal to 2 normal. It is preferred to employ a 0.3 normal solution of ammonium vanadite. The hydrogel is then separated from the supernatant ammonium vanadite solution in any well-known manner, as by draining.

Another batch of silica hydrogel is immersed in a solution of chromium chloride, the concentration of which may vary from 0.01 to 1 normal. It is preferred to employ a 0.1 normal chromium chloride solution, usually soaking for a number of hours, say about 24 hours, is sufficient to effect the impregnation. The supernatant chromium chloride solution is then separated from the hydrogel in any well-known manner as by draining.

100 grams of the batch of hydrogel charged with ammonium vanadite is mixed with 75 grams of the batch of hydrogel charged with chromium chloride, and the mixture kneaded by mechanical means. The ammonium vanadite reacts with the chromium chloride to form chromium vanadite. As the relative amounts of the two batches are such that the ammonium vanadite solution is present in excess, the mixture after incorporation contains two compounds of an active metal, namely, chromium vanadite and the uncombined ammonium vanadite. The mass is then converted into a final product as described in Example 1.

Example 8

A batch of gel fines of silica is placed in a receptacle. A calcium chloride solution is then introduced into the receptacle in an amount sufficient to cover the gel fines. The concentration of calcium chloride solution may vary from 0.1 N. to 1.0 N. The batch of gel fines is allowed to soak in the calcium chloride as for example, about 5 minutes up to several hours whereupon the spent solution is separated therefrom as by draining.

Another batch of gel fines of silica is placed in a receptacle, and a sodium ortho-vanadate solution is introduced therein in a sufficient amount to completely submerge the gel fines. A sodium ortho-vanadate solution of about 1 normal gives satisfactory results. Soaking for about 5 minutes up to several hours, is sufficient to complete the impregnation. The spent vanadium solution is then separated from the gel fines in any well-known manner as by draining.

100 grams of the batch of gel charged with calcium chloride is mixed with 100 grams of the batch of gel charged with the vanadate solution, and the mixture thoroughly triturated so as to effect a thorough dissemination. During the trituration the calcium chloride and sodium vanadate solutions react to form calcium vanadate. The relative amounts of the two batches are such that the vanadate solution is present in an amount substantially equal to that required to chemically combine with the calcium chloride. The mixture after trituration contains only one compound of vanadium, namely, calcium vanadate.

The mass is then compressed, and dried in any well-known manner. If desired, a binder may be incorporated in the mass, then compressed, and dried.

Where the product obtained from the process of the present invention is desired to be used as a catalyst in a contact process for making sulphur trioxide, it is preferred to activate same as by heating for several hours at a temperature of 400° to 500° C. in the presence of sulphur dioxide gas.

Various specified details of procedure and conditions of operation have been set forth above for the purpose of giving a clear understanding of the process, but the invention is not limited to the exact details given, as it includes modifications and changes coming within the scope of the appended claims.

The adjective "active" as employed in the specification and claims is intended to refer to catalytically active compounds or substances.

Having thus described the invention, what is claimed as new and desired to be secured by Letters Patent is:

1. The process of preparing catalytic masses consisting in charging a batch of carrier material with a solution of a reactant substance, charging another batch of a carrier material with a solution of a compound of a metal capable of reacting with said reactant substance to form an active compound of said metal, incorporating the two batches together to cause the reaction between the reactant substance and metal compound, and drying the mixture without washing.

2. The process according to claim 1 wherein the reactant substance is a hydroxyl bearing compound.

3. The process according to claim 1 wherein the reactant substance is a non-hydroxyl bearing compound.

4. The process according to claim 1 wherein the solution of the metal compound contains an activator substance.

5. The process according to claim 1 wherein the two batches are incorporated together in such relative amounts that one of the solutions is present in excess of that required to chemically combine with the other.

6. The process of preparing catalytic masses consisting in charging a batch of carrier material with a solution of a reactant substance, charging another batch of a carrier material with a solution of a compound of a metal capable of reacting with said reactant substance to form an active compound of said metal, incorporating the two batches together to cause the reaction between the reactant substance and metal compound, adding a carrier material impregnated with a compound of an active metal to said mixture, and drying the mixture without washing.

7. The process according to claim 6 wherein the reactant substance is a hydroxyl bearing compound.

8. The process according to claim 6 wherein the solution of the metal compound contains an activator substance.

9. The process according to claim 6 wherein the two batches are incorporated together in such relative amounts that one of the solutions is present in excess of that required to chemically combine with the other.

10. The process of preparing catalytic masses consisting in charging a batch of a hydrous gel with a solution of a hydroxide of one of the members of the group consisting of alkali metals, alkaline earth metals, and ammonium, charging another batch of a hydrous gel with a solution of a compound of a metal capable of reacting with said hydroxide to form an active compound of said metal, incorporating the two batches together to cause the reaction between the hydroxide and metal compound, and drying the mixture without washing.

11. The process according to claim 10 wherein the hyroxide is sodium hydroxide, and the metal compound is a salt of vanadic acid.

12. The process according to claim 10 wherein the solution of the metal compound contains an activator substance.

13. The process according to claim 10 with the added step of incorporating a hydrous gel impregnated with a compound of an active metal in the mixture of the respective hyrous gels.

14. The process according to claim 10 wherein the two batches are incorporated together in such relative amounts that one of the solutions is present in excess of that required to chemically combine with the other.

15. The process according to claim 10 with the added step of forming the mixture into granules prior to drying.

16. The process of preparing catalytic masses consisting in charging a batch of a hydrous gel with a solution of a non-hydroxyl bearing compound, charging another batch of hydrous gel with a solution of a compound of a metal capable of reacting with said non-hydroxyl compound to form an active compound of said metal, incorporating the two batches together to cause the reaction between the hyroxide and non-hydroxyl bearing compounds, and drying the mixture without washing.

17. The process according to claim 16 wherein the non-hydroxyl bearing compounds is a salt of a metal capable of reacting with a salt of another metal to form an active compound of said other metal.

18. The process according to claim 16 wherein the non-hydroxy bearing compound is a salt of chromium, and that of the metal compound, a salt of vanadic acid.

19. The process according to claim 16 wherein the two batches are incorporated together in such relative amounts that one of the solutions is present in excess of that required to chemically combine with the other.

GERALD C. CONNOLLY.
JEREMIAH A. PIERCE.